Figure 1:
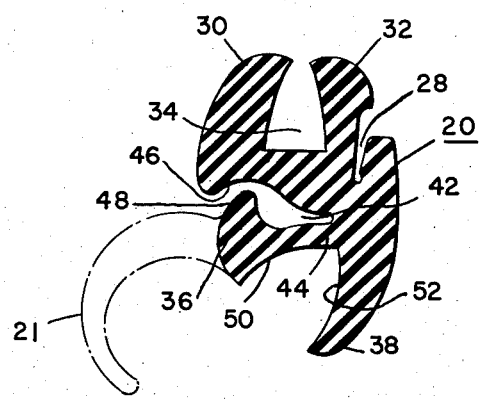

Sept. 18, 1956     P. E. CLINGMAN ET AL     2,763,345
CONNECTOR STRIP
Filed June 9, 1953

INVENTOR.
Paul E. Clingman
George W. Beck
By
Attorney

United States Patent Office 2,763,345
Patented Sept. 18, 1956

2,763,345
CONNECTOR STRIP

Paul E. Clingman and George W. Beck, Dayton, Ohio, assignors to General Motors Corporation, Detroit, Mich., a corporation of Delaware Application June 9, 1953, Serial No. 360,474

3 Claims. (Cl. 189—78)

This invention relates to elastomeric strips and more particularly to elastomeric strips adapted to sealingly connect sheet-like panels in an edge to edge relation.

Various forms of mounting strips are now used for connecting sheet-like panels, examples of these being disclosed in Eichner Patent 2,189,138 and Geyer Patent 2,492,566, both assigned to the assignee of the present invention. While strips of this type have been found satisfactory in many instances, difficulties have been frequently encountered in attaching the strips in position upon the connecting curved panels and particularly when the panels are of relatively large size.

This invention is directed to an improved mounting strip which can be more effectively assembled between the panels to be connected and thereafter provide a uniformly tight and leak-proof seal between the connected parts.

In carrying out this objective, the body of the strip is formed with integral means for holding a portion of the strip in a retracted position when the portion is pivoted on the integral hinge to provide a free passage for an edge of a panel into a panel receiving groove formed in the strip during the assembly of the panel and strip and means for holding the strip in sealing engagement with the panel after the connection is formed.

Another purpose of the present invention is to provide an elastomeric sealing strip that is adapted to sealingly connect the margins of two sheet-like panels in an edge to edge relation and more particularly to provide a strip that is adapted, after being placed on the marginal edge of one of the two panels, to provide an open groove for facilitating the assembly of the strip and the other panel. This object is materialized by hingedly attaching and forming a lip portion on the body of the strip which is formed in a retracted position for opening the panel receiving groove formed thereby and which will be held in the retracted position when surface portions thereof frictionally engage surface portions of the body of the strip that have been flexed toward said lip when the body of said strip is distorted by the margin of the panel to which the strip is first applied, said lip being hingedly attached to the body of said strip for being pivoted from the retracted position to a panel engaging position when a filler strip is inserted in a groove formed in said strip body so as to bear against a portion of said lip to force said lip into a tight sealing engagement of the part associated therewith.

Another advantage embodied in the present invention is to provide a sealing strip particularly adapted to be used in connection with automotive bodies and the like, which strip acts as a joining and sealing means between the body and the windshield or the rear window of the automobile and has a portion thereof adapted to be held in a retracted position, to permit a margin of one part to be joined by the strip to readily pass into a groove during the assembly of the part and the strip.

Further objects and advantages of the present invention will be apparent from the following description reference being had to the accompanying drawings wherein a preferred embodiment of the present invention is clearly shown.

In the drawing:

Fig. 1 shows a cross section of a strip as formed according to the present invention.

Figure 2:
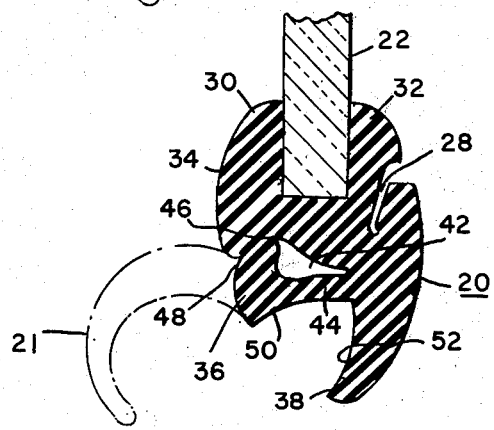

Fig. 2 in section shows the strip in Fig. 1 as engaging a margin of a part in one groove and having a second groove open for receiving the margin of another part therein.

Figure 3:
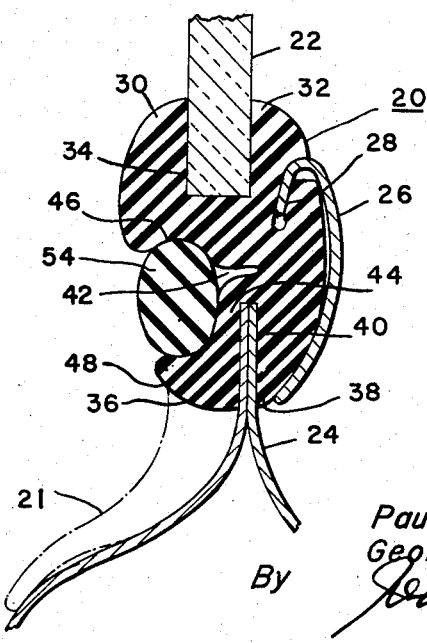

Fig. 3 shows the strip in Fig. 1 as engaging the margins of two parts with a filler strip inserted for forming a tight sealing engagement therewith.

Sealing or connecting strips are widely used, particularly in the automotive field, as a means for joining and sealing the edges of parts. One of the most common usages of such connecting or sealing strips is in connection with automobile bodies wherein the strip not only joins and cushions the glass to portions of the body but also seals the glass and the body against the elements. Examples of this type of strip are shown in a patent to R. H. Chilton 2,623,250, and John T. Marvin 2,654,919, assigned to the assignee of the present invention. It is apparent that this type of mounting is very economical and is adapted to permit the replacement of a pane of glass when required. It has been found that the installation of glass within the sealing strips of this type is often difficult, particularly in the modern automotive vehicles wherein a large pane or sheet of curved glass forming the rear window or windshield of the vehicle is inserted in an aperture in the vehicle body. To accomplish this connection various expedients have been used to hold open the grooves during the assembly of the parts. One of these methods has been to assemble the strip around the body opening, circumferentially wrap a cord under tension about one of the lips of the glass receiving groove so as to maintain the groove in an open position so that the glass or panel may be inserted therein and then to remove the cord to permit closing of the groove.

The present invention is directed to the elimination of the difficulties of forming this connection. This is accomplished by providing a sealing strip wherein the particular configuration of certain portions of the strip permits the panel receiving groove to be maintained in an open position during the assembly of the glass panel within the vehicle body.

In the form shown in Fig. 3, the connector strip 20 of elastomeric material has a uniform cross section throughout its length and is adapted to mount the margins of a glass panel or part 22 upon the margin of a relatively thin metal panel 24, which may consist of a pinch weld of two portions of the body of an automobile. In the form shown, the strip may be furnished with or without a tongue or flap 21 that is adapted to further aid the formation of the seal with the body portion 24 of the automobile as the tongue 21 lies along the body as shown in Figure 3 to act as a flashing for the joint of the strip with the body. Further a garnish molding 26 is provided, if desired, to furnish an ornamental appearance to this strip when it is in place on the vehicle which molding is adapted to be inserted in a groove 28 and thus be attached to the strip 20.

The body portion 20 of the strip has two pairs of lip or wing portions 30 and 32 forming a panel 22 receiving groove 34 and another pair of lip portions 36 and 38 that are arranged to form another panel retaining groove 40 that is adapted to receive panel 24 therein. A third groove 42 located between opposed grooves 34 and 40, preferably extends into the main body portion of the strip 20 beyond the projection of either the opposed grooves 34 and 40 and is shaped and located to provide a thin section 44 of resilient material between grooves 40 and 42 around which lip 36 may be pivoted without hindrance. A surface 46 formed on the upper inner surface of groove 42 is shaped to have a corresponding configuration to the outer surface portion 48 of lip 36 and is arranged to form a nested frictional engagement therewith and maintain the lip 36 in a retracted position when the lip is pivoted on the hinge portion 44 into the position shown in Fig. 2. The lips 30 and 32, as shown in Fig. 1 are formed so the walls of the groove have a taper with the portion of greatest width being located at the root portion of groove 34. This taper is arranged so the lips will be forced apart when panel 22 is inserted therebetween so as to distort a portion of the body of strip 20 and force surface 46 downwardly and thus increase the frictional engagement between lip 36 when pivoted to its retracted position as shown in Fig. 2. It is to be here noted that the lip 36 is formed substantially at right angles to the axis of grooves 34 and 40. This right angle position is maintained or even increased when hinged lip 36 is held in the retracted position in the manner hereinbefore described and when in this position a surface portion 50 forming one wall of groove 40 will be substantially at right angles to the surface 52 on lip 38 which forms another portion of groove 40 to permit a panel 24 to be readily passed without hindrance therein. When the lip 36 is released from its retracted position, and is pivoted downwardly to bring the surface 50 in engagement with panel 24, filler strip 54 of flexible material may be inserted in groove 42 to bear against and force lip 36 into tight sealing engagement with the panel 24.

In an application Ser. No. 360,475, as filed June 9, 1953, by Paul E. Clingman, one of the assignees as assigned to the assignor of the present invention, a curved pane of glass of substantial size is shown as mounted in an aperture of a body portion of an automobile. This pane of glass may be readily installed in the aperture if a strip according to the present invention is employed. The strip may first be applied to the peripheral portion of the glass panel to form a circumferential boundary therefor. When in position the lip 46 may be positioned in its retracted position and there held in nested engagement with a surface portion of lip 30 as the pane of glass forces portions of lip 30 downwardly so that the panel receiving groove 40 is opened and has its walls substantially at right angles to each other. The pane of glass and its attached strips may then readily be inserted within the aperture of the body and when in position will be secured therein when the lip 46 is released and pivoted so a filler strip 54 may be inserted in groove 42 to bear against the lip 36 and thus join the panels of the respective parts. It is readily apparent that the installation procedure may be reversed so that the strip is first applied to the body of the vehicle and the glass pane may be installed in a suitable glass receiving groove held open in the manner heretofore described.

It is manifest that the material of the sealing strip may be of any suitable elastomeric material, such as, rubber, synthetic rubber, such as butadiene-styrene copolymers, butadiene-acrylonitrile copolymers, polychloroprene, compatible mixtures of the above materials, plastic materials such as certain of the vinyls, etc., the only requirement being that the material is sufficiently springy and rubber-like so that it will be stretched so as to permit unimpeded movement of the thin hinge portion and form a satisfactory interlock with the material of the filler strip which may be of the same material as the main body strip or any other material suitable for forming a locking engagement within the groove in the elastomeric part and for deforming portions thereof so as to provide a tight seal between the strip and panel. Strips of this character may be made by molding or extrusion or any other satisfactory production method and may be compounded so as to form any color combination desired. Further the strip may be used to join panels of wood, metal, glass, etc., or any combination thereof, the use of such strips not being limited to glass combinations alone. It is understood that variations in the width of grooves must be carried out to meet the specific installation requirements.

While the embodiment of the present invention as herein disclosed, constitutes a preferred form, it is to be understood that other forms might be adopted.

What is claimed is as follows:

1. In an elastomeric sealing strip having two pairs of lips defining a pair of oppositely disposed grooves on opposite sides of a strip body for sealingly conecting margins of panels to be joined, a means for holding one of said lips in a retracted position for facilitating the assembly of the strip and panel and a separate means for holding said lip in a panel engaging position, said first mentioned means comprising; one pair of lips one of which is deformable and adapted to be flexed and cause a portion of the body of said strip to be deformed and moved toward the second pair of lips when a margin of a panel is positioned between said first pair of lips, a second lip forming one of the lips of said second pair of lips and normally disposed at right angles on the same side of the strip body as said first lip and hingedly joined to said strip body and having a convex surface portion complementary in shape to a concave portion of the surface on the flexed and deformed portion of said first lip for being engaged thereby for tightly holding said second lip in a retracted position for facilitating the entry of the margin of a panel into the groove associated with said second lip, said second means comprising; a filler strip for holding said first and second lips in engagement with the respective panels when the margins of the panels are positioned in said grooves.

2. An elastomeric sealing strip adapted for connecting panels in a cushioning relation, comprising; a longitudinally extending body of elastomeric material having a pair of oppositely disposed grooves on the opposite sides thereof for receiving margins of panels therein, one of said grooves having walls adapted to be spread when a margin of a panel is received therein for deforming a portion of said body and flexing said deformed portion thereof into a third groove formed on a side of the body between said pairs of grooves, and a lip portion forming one of the walls of said other groove normally disposed substantially at right angles to another wall thereof, said lip having a convex surface portion thereon complementary in shape to a concave surface of said deformed portion and adapted to be tightly held in its normal right angled position when said surfaces engage one another for facilitating the assembly of the strip and the margin of a second panel, said lip being hingedly joined to said body by a thin flexible neck and being bodily swingable thereabout into a panel engaging position for forming a sealing engagement therewith when a filler strip inserted into the third groove forces said lip against the margin of said second panel.

3. An elastomeric sealing strip for sealing and joining adjacent margins of two sheet-like parts comprising; an elongate body of elastomeric material having a continuously longitudinally extending groove, a taper on the walls of said groove arranged so the root portion of the groove is normally wider than the remainder thereof, portions of the body of said strip are deformed when the walls of the groove are spread as a margin of a part is received therein, a continuous longitudinally extending lip oppositely disposed to said groove on the opposite side of said body of said strip forming one of the walls of a second part receiving groove, a second continuous longitudinally extending lip formed in the body on the side opposite the first groove and normally oriented substantially at right angles to a projection thereof and having a surface on one side adapted to cooperate with said first lip to define a second part receiving groove, said second lip being carried by said body by a thin section of elastomeric material for providing a pivotal connection therebetween and having a convex surface portion thereon complementary in shape with a surface of a concave portion of the strip body which forms a portion of the first part receiving groove, said surfaces being adapted to mutually engage one another for holding said second lip tightly in its right angled position when the body of said strip is deformed as a part is inserted in the first part receiving groove whereby the assembly of a part in the second part receiving groove is facilitated as a margin of the second part is inserted into said second groove without engaging the wall portions of the second lip, and a filler strip adapted to be inserted in a space between the concave complementary surface portions of said strip body and said second lip for holding said second lip in a part engaging and sealing position relative to said first lip after said second lip is released from the held right angled position and is pivoted into a part engaging position.

References Cited in the file of this patent

UNITED STATES PATENTS

| | | |
|---|---|---|
| 2,189,138 | Eichner | Feb. 6, 1940 |
| 2,288,329 | Smith | June 30, 1942 |
| 2,492,566 | Geyer | Dec. 27, 1949 |
| 2,623,250 | Chilton | Dec. 30, 1952 |
| 2,654,919 | Marvin | Oct. 13, 1953 |
| 2,660,275 | Beck | Nov. 24, 1953 |